(12) United States Patent
Al-Eidan

(10) Patent No.: US 8,359,882 B2
(45) Date of Patent: Jan. 29, 2013

(54) AIR CONDITIONING SYSTEM WITH SELECTIVE REGENERATIVE THERMAL ENERGY FEEDBACK CONTROL

(76) Inventor: Abdullah A. Al-Eidan, Bayan (KW)

( * ) Notice: Subject to any disclaimer, the term of this patent is extended or adjusted under 35 U.S.C. 154(b) by 833 days.

(21) Appl. No.: 12/102,448

(22) Filed: Apr. 14, 2008

(65) Prior Publication Data

US 2008/0314064 A1    Dec. 25, 2008

Related U.S. Application Data

(60) Provisional application No. 60/911,602, filed on Apr. 13, 2007.

(51) Int. Cl.
*F25B 41/00*    (2006.01)
(52) U.S. Cl. ............................ 62/513; 62/112
(58) Field of Classification Search .............. 62/513, 62/113
See application file for complete search history.

(56) References Cited

U.S. PATENT DOCUMENTS

| | | | | |
|---|---|---|---|---|
| 4,590,770 A * | 5/1986 | Howard | | 62/50.2 |
| 5,931,640 A * | 8/1999 | Van Houten et al. | | 416/128 |
| 6,474,087 B1 * | 11/2002 | Lifson | | 62/199 |
| 6,479,957 B1 * | 11/2002 | Erdman et al. | | 318/400.22 |
| 2004/0187514 A1 * | 9/2004 | Franck et al. | | 62/352 |
| 2006/0107682 A1 * | 5/2006 | Park et al. | | 62/324.1 |
| 2006/0123840 A1 * | 6/2006 | Lifson et al. | | 62/513 |
| 2006/0137387 A1 * | 6/2006 | Aflekt et al. | | 62/513 |
| 2007/0095087 A1 * | 5/2007 | Wilson et al. | | 62/259.2 |

* cited by examiner

*Primary Examiner* — Frantz Jules
*Assistant Examiner* — Casey D Bauer
(74) *Attorney, Agent, or Firm* — Lowe Hauptman Ham & Berner, LLP

(57) ABSTRACT

An air conditioning and heating system includes an condenser, an expansion valve, an evaporator and a compressor interconnected in a closed loop system, and a motor for driving the compressor. The system also includes a refrigerant disposed within the closed loop system. The compressor compresses the refrigerant and pumps the refrigerant through the system. The system also includes one or more feedback loops to reduce the temperature (pre-cool) the refrigerant before it reaches the expansion valve in the cooling mode and the same or a different heat exchanger in the heating mode. The additional heat exchangers are placed in the loop to reduce the electric energy being used.

5 Claims, 13 Drawing Sheets

AIR CONDITIONING SYSTEM WITH SELECTIVE REGENERATIVE THERMAL ENERGY FEEDBACK CONTROL

RELATED APPLICATIONS

The present application is based on, and claims priority from, U.S. Application No. 60/911,602, filed Apr. 13, 2007, the disclosure of which is hereby incorporated by reference herein in its entirety.

FIELD OF THE INVENTION

This invention relates to air conditioning systems and more particularly to high efficiency air conditioning and climate control systems utilizing heat exchangers and one or more feedback loops.

BACKGROUND FOR THE INVENTION

All basic AC systems use a refrigeration cycle such as shown in FIG. 1. The refrigeration cycle is performed by a coolant flow through a condenser coil, an expansion valve, an evaporator coil and a compressor.

In the refrigeration cycle, a heat pump transfers heat from a lower temperature heat source into a higher temperature heat sink. Heat would naturally flow in the opposite direction due to the second law of thermodynamics. This is the most common type of air conditioning. A refrigerator works in much the same way, as it pumps the heat out of the interior into the room in which it stands.

The most common refrigeration cycle uses an electric motor to drive a compressor. In an automobile the compressor is driven by a belt connected to a pulley on the engine's crankshaft, with both using electric motors for air circulation. Since evaporation occurs when heat is absorbed, and condensation occurs when heat is released, air conditioners are designed to use a compressor to cause pressure changes between two compartments, and actively pump a refrigerant through the system. A refrigerant is pumped into the low pressure compartment (the evaporator coil), where, despite the low temperature, the low pressure causes the refrigerant to evaporate into a vapor, taking heat with it. In the other compartment (the condenser), the refrigerant vapor is compressed and forced through another heat exchange coil, condensing into a liquid, rejecting the heat previously absorbed from the cooled space. The heat exchanger in the condenser section (the heat sink mentioned above) is cooled most often by a fan blowing outside air through it, but in some cases can be cooled by other means such as water, especially on some ships, geothermal and cooling towers.

Air conditioning equipment usually reduces the humidity of the air processed by the system. The relatively cold (below the dewpoint) evaporator coil condenses water vapor from the processed air, sending the water to a drain and removing water vapor from the cooled space and lowering the relative humidity. The comfort air conditioner is designed to create a 40% to 60% relative humidity in the occupied space. In food retailing establishments, large open chiller cabinets act as highly effective air dehumidifying units.

Some air conditioning units dry the air without cooling it. They work like a normal air conditioner, except that a heat exchanger is placed between the intake and exhaust. In combination with convection fans they achieve a similar level of comfort as an air cooler in humid tropical climates, but only consume about ⅓ of the electricity. They are also preferred by those who find the draft created by air coolers discomforting.

Typical refrigerant used is "Freon", a trade name for a family of haloalkane refrigerants manufactured by DuPont and other companies. These refrigerants are commonly used due to their stability and safety properties.

A simple vapor compression cycle (VCC), FIG. 2, is some times referred to as Rankine cycle is composed of four operations:

1. Process 1-2: Isotropic compression, S=C. The refrigerant enters to the input of the compressor; it is pressured in a reverse adiabatic process with constant entropy and outputs at pressure $P_c$ e.g. 28 bar.

The compressor's work done is the input work=$W_c$=m'($h_2-h_1$)

Where m' is the mass flow rate and h is the enthalpy.

2. Process 2-3: is the heat rejection to hot region@PC through the condenser.

The output refrigerant from the compressor is in liquid form.

The heat lost in the condenser is $Q_c$=m'($h_2-h_3$).

3. Process 3-4: Throttling process@h=c, is the throttling through the capillary or expander valve to a lower output pressure Pe (e.g. 11 bar or 1100 KPa) at the evaporator input. This is an adiabatic process without any work, i.e. $h_4=h_3$.

4. Process 4-1: Heat addition at cold region@P=C. Heat is gained by the refrigerant, which is a mixture of liquid and vapor and it exits in saturated vapor phase. This process happens at constant pressure.

The heat gained is given by the evaporator's load=$Q_e$=m'($h_1-h_4$).

Where one ton of refrigeration (T. R.) is given by 12,000 BTU/hr.

The refrigeration effect is the enthalpy difference between entering and exiting from the evaporator.

$$RE=h_2-h_1$$

The coefficient of performance (COP)=$Q_e/W_c$ RE/$W_c$=($h_1-h_4$)/($h_2-h_1$)

The mass flow rate is given by m'=$Q_e$/RE

More recent approaches to air conditioning and climate control systems are disclosed in the following patents.

A U.S. patent of Dennis (U.S. Pat. No. 5,782,101) discloses a heat pump operating in the heating mode refrigerant pressure control. As disclosed therein, a heat pump system operates in the heat cycle mode wherein a sensor is provided for sensing either the pressure or temperature of a refrigerant. A speed controller receives an output of the sensor so that the speed of an evaporator fan is controlled, resulting in the control of the pressure or temperature of the refrigerant. The temperature or pressure of the refrigerant is controlled for a heat pump system comprising one refrigeration circuit and more than one refrigeration circuit.

A more recent patent of Wightman (U.S. Pat. No. 6,314,747) discloses a vapor compression system. As disclosed the system includes an evaporator, a compressor and a condenser interconnecting in a closed loop system. In one embodiment, a multifunctional valve is configured to receive a liquefied heat transfer fluid from the condenser and a hot vapor from the compressor. A saturated vapor line connects the outlet of the multifunctional valve to the inlet of the evaporator and is sized so as to substantially convert the heat transfer fluid exiting the multifunctional valve into a saturated vapor prior to delivery to the evaporator.

In a U.S. Pat. No. 6,378,323 of Chavagnat a reversible heat pump system includes heat exchangers having significantly different refrigerant handling capacities and a refrigerant holding device for holding excess refrigerant during the heating mode of operation. The refrigerant holding device includes a heat exchanger located therein for sub-cooling the refrigerant.

A more recent patent of Satzger (U.S. Pat. No. 7,080,520) discloses an air conditioning system based on a climate control system for a vehicle that is driven by an internal combustion engine. A heating heat exchanger is connected to a coolant loop of the engine and is preceded upstream of a blower by an evaporator and a compressor in a refrigerant loop. During a cooling mode, it pumps a refrigerant via a gas cooler and via an expansion valve to the evaporator and during a heating mode pumps into the evaporator bypassing the gas cooler and is disposed between the coolant loop and the refrigerant loop. A coupling heat exchanger is provided.

Finally, a U.S. patent of Ambs et al. (U.S. Pat. No. 7,228,696) discloses a hybrid heating and cooling system wherein the system includes an indoor air coil subcircuit, an outdoor air coil subcircuit, a geothermal subcircuit and a cooling system for selectively operating the system in air-to-air heating, air-to-air cooling, geothermal heating. The various subcircuits may be connected to one another in parallel.

Notwithstanding the above it is presently believed that there is a need for a high efficiency air conditioning and climate control system in accordance with the present invention. Such systems are believed to reduce the cost of operating such systems.

BRIEF SUMMARY OF THE INVENTION

In essence, an air conditioning system in accordance with the present invention includes a condenser, an expansion valve, an evaporator and a compressor interconnected in a closed loop system. A refrigerant is disposed in the closed loop system and a motor provided for driving the compressor to compress the refrigerant and pump the refrigerant through the condenser, the expansion valve, the evaporator and back to the compressor during a cooling cycle. The heat exchanger is disposed in the closed loop system between the condenser and the expansion valve for pre-cooling the refrigerant before it flows into the expansion valve and a feedback loop is provided in the closed loop system for conducting refrigerant from the evaporator back through the heat exchanger for raising the temperature of the refrigerant before returning the refrigerant to the compressor. A solenoid valve is disposed between the evaporator and the heat exchanger while a first blocking valve is provided between the evaporator and the compressor and a second blocking valve between the heat exchanger and the compressor. An electronic control for adjusting and/or throttling the cold refrigerant flow is also provided.

The invention will now be described in connection with the accompanying figures.

DESCRIPTION OF THE PREFERRED EMBODIMENTS OF THE INVENTION

Figure 1:
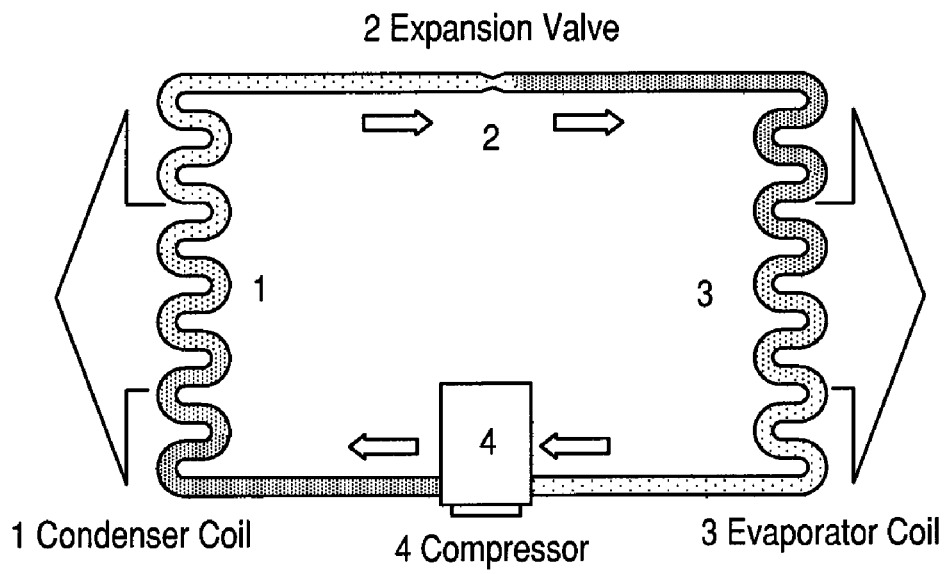
FIG. 1 is a diagram of a conventional refrigeration cycle.

In describing the preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

An air conditioning system is described in detail by way of example, although it is understood that corresponding air heating system blocks can be substituted for air conditioning blocks, to form an efficient heating system.

Moreover, minor functional elements (such as valves and the like) well understood by those skilled in the art have been purposely omitted from the following discussion.

Figure 3:
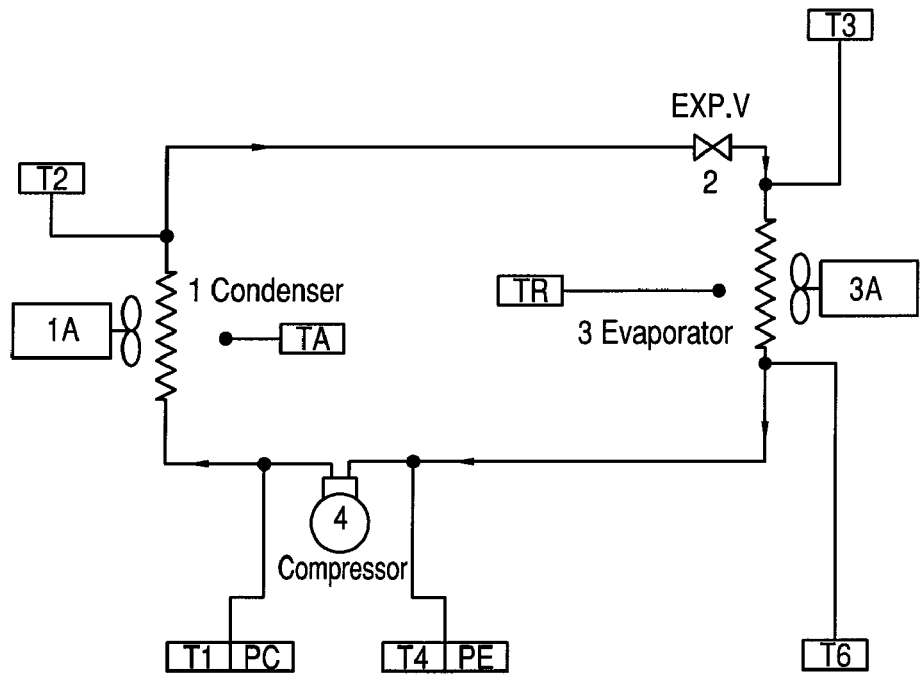
FIG. 3 is a schematic illustration of a conventional air conditioning system.

Simplified block diagrams of the conventional and efficient air conditioning system are shown in FIG. 3.

FIG. 3 explains the temperature cycle through the compressor (4), condenser (1), condenser fan (1A), expansion valve (2) and the evaporator (3), evaporator fan (3A) of a conventional AC System by specifying the temperature before and after each node.

In the conventional AC system the outlet temperature of the evaporator T6 passes through to the compressor terminals and the condenser in contact with the outdoor ambient air directly.

The three external factors control the efficiency the air-conditioning system, the outside air temperature, the relative humidity and the indoor temperature.

Outside ΔT: The different between the outside air temperatures and the condenser temperature.

Indoor ΔT: The different between the indoor air temperatures and the evaporator temperature.

1. The Outside Air Temperature:

When the outside temperature decreases, this will lower the temperature of the condenser which lowers the temperature of the compressed Freon gas leaving the condenser which will lower the temperature the expanded (evaporated) Freon gas in the evaporator this causes higher heat transfer from the room air to the evaporator, which increases the air condition efficiency (Higher Indoor ΔT).

With higher heat transfer will increase the evaporated Freon gas entering the compressor which increases the temperature of the compressed Freon leaving the compressor which increases the temperature of the condenser; this causes higher heat transfer from the outside air to the condenser, which increases the air condition efficiency (Higher Outside ΔT).

When the outside temperature increases, this will increase the temperature of the condenser which increases the compressed Freon gas temperature that leaving the condenser; which increases the temperature of the evaporated Freon in the evaporator; these causes decrease the heat transfer from the room air to the evaporator which decreases the air condition efficiency (Lower Indoor ΔT).

With lower heat transfer will decrease the evaporated Freon gas entering the compressor which decreases the temperature of the compressed Freon leaving the compressor which decreases the temperature of the condenser; to cause lower heat transfer from the outside air to the condenser, which decreases the air condition efficiency (Lower Outside ΔT).

2. The Room Air Temperature:

When the temperature difference between the room air (inside air) and the evaporator increases (Higher Indoor ΔT), which causes a higher evaporated Freon temperature in the evaporator this causes higher heat transfer. When a higher temperature evaporated Freon returns to the compressor, it causes an increase in the temperature of the compressed Freon in the condenser which increases this will increase the heat transfer to outside air which increases the air condition efficiency (Higher Outside ΔT).

When the Room air temperature Decreases, (Lower Indoor ΔT) which causes a lower heat transfer from the room air to the evaporator, this causes lower temperature evaporated Freon. When a lower temperature evaporated Freon returns to the compressor, it causes a decrease in the temperature of the compressed Freon in the condenser which decreases this will decrease the heat transfer to outside air which decreases the air condition efficiency (Lower Outside ΔT).

3. The Outside Relative Humidity:

When the outside air relative humidity increases; the humid outside air passes through the hot condenser causes the evaporation of the humidity in the outside air which takes the heat from the condenser which increases the air condition efficiency (Higher Outside ΔT).

When the outside air relative humidity decreases; the dry outside air passes through the hot condenser which takes less heat transfer from the condenser to the outside air, which decreases the air condition efficiency (Lower Outside ΔT).

4. The Room Relative Humidity:

When a humid room air passes through the cold evaporator, this causes condensation of the humidity in the evaporator. The condensation increases the temperature of the evaporator which this causes lower heat transfer from room air to the evaporator (most of heat transfer caused by humidity condensation action) which decreases the air condition efficiency (Lower Indoor ΔT).

When a dry room air passes through the cold evaporator; this did not causes condensation of the humidity in the evaporator. The dry room air passes through the cold evaporator causes less condensation of the humidity in the condenser this will increase heat transfer from room air to the evaporator which increases the air condition efficiency (Higher Indoor ΔT).

The air condition efficiency decreases when the cooling is needed i.e., when the weather become warmer the air condition becomes less efficient and also when the inside temperature become colder the air condition becomes less efficient, and the least air condition efficient when the outside temperature increased and the indoor temperature decreased.

In case of heating application (the reverse mode) also faces the same problem, the condenser becomes an evaporator (cold) and the evaporator becomes a condenser (hot). When the outside air becomes colder (Lower Outside ΔT) the heat pump becomes less efficient. When the Room air temperature Increases, (Lower Indoor ΔT) which causes a lower heat transfer. The least heat pump efficient when the outside temperature decreased and the indoor temperature increased.

The question is how to over come this dilemma; we can not control the outside weather and we can not increase or decrease the indoor temperature, the purpose of the air condition to provide a comfortable indoor environment in the hot or cold environment. The answer is to redesign the conventional air condition to increase its efficiency to reduce the power. consumption which reduces the carbon dioxide emission by utilizing internal heat exchangers, one or several feed back loops between the output of the evaporator (cold refrigerant) with the output of the condenser which decreases (hot refrigerant), this action will cool the hot refrigerant going to expansion valve which will decrease the temperature of the evaporator i.e. will increase the Indoor ΔT which improves the efficiency of the air condition. At the same time it will increase the temperature of the cold refrigerant going to the compressor which increases the temperature of the hot refrigerant going to the condenser i.e. increases outside ΔT which improves the efficiency of the air condition.

The high efficiency AC will equipped with components such as:

(A) Variable speed counter-rotating condenser blower, which have more airflow, reduction in the blower noise and energy efficient.

(B) Multiple-speed compressors (Two-compressor systems) reducing peak energy under part-load conditions. State-of-the-art high-efficiency compressors Multiple-speed compressors Screw Compressor (Rotary) or Two-compressor systems to improve efficiency under part-load conditions.

(C) Improved and larger size heat exchange surfaces to allow more heat transfer of the extra regenerative heat transfer.

(D) Using a DC motors with a permanent magnet for the condenser fan, evaporator fan and the compressor which will reduce the electrical consumption at least 15% (saving the field current). Using 24 volt DC or higher to increase the power of the motors.

(E) Safety Pressure Sensor: During the hot weather the regenerative feedback action will increase the temperature of the compressor which will increases pressure of the compressor, a safety high pressure sensor will over ride the feedback valve and closing it, this action will reduce the compressor temperature which will reduce the compressor pressure (F) Electronic control system with thermocouple based temperature measurement system.

(G) Electronic controlled motors available in the market which reduces the current when the motor not under load condition.

Figure 4:
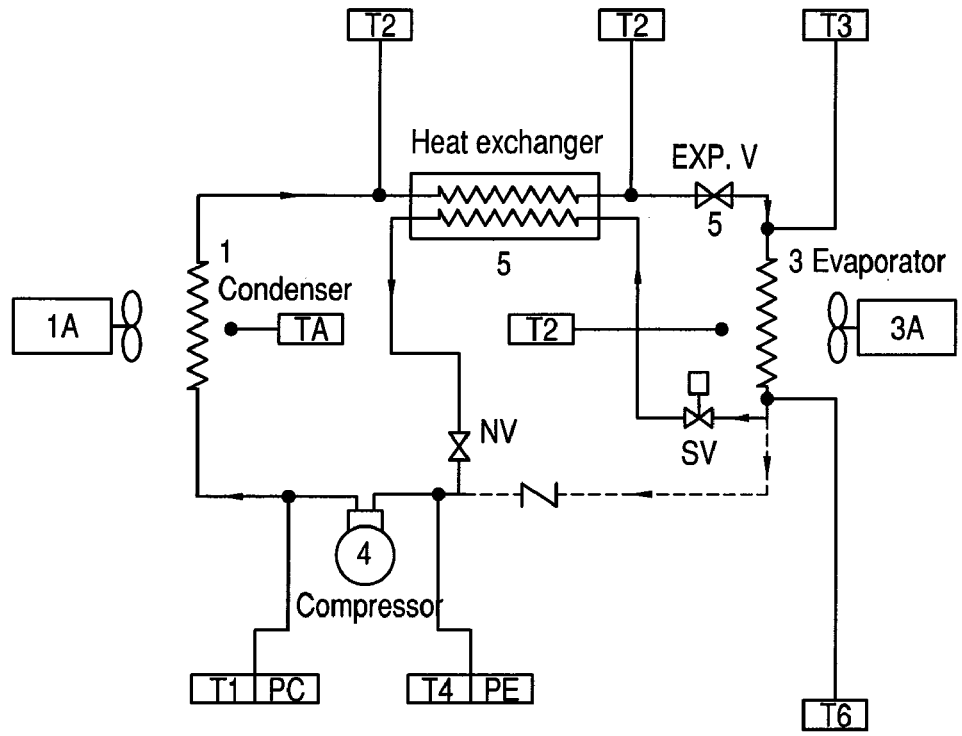
FIG. 4 is a schematic illustration of an air conditioning system according to one embodiment of the invention.

FIG. 4 shows the block diagram of the high efficiency AC system and the thermocouple location to measure the temperature readings at the different nodes. The solenoid valve (SV) is used to control the coolant flow path through the heat exchanger in the improved air conditioning cycle, while isolating the piping section between the evaporator and the compressor. The system shown utilizes a heat exchanger (5), a solenoid valve (SV). a blocking valves (NV1, NV2) and an electronic control system with thermocouple based temperature measurement system.), the solenoid valves and the blocking valves can be On OFF valves or Butterfly valves. In case of using On OFF valves, the solenoid valve (SV) will be opened while the blocking valves will be closed and in case of using Butterfly valves the blocking valves will start opening while the blocking valves start to close until the (SV) valves fully opened and the blocking valves fully closed according to the temperature readings and to avoid compressor over heating.

The outlet temperature of the evaporator, T6, returns through the heat exchanger coil to the compressor terminals at T4.

Figure 5:
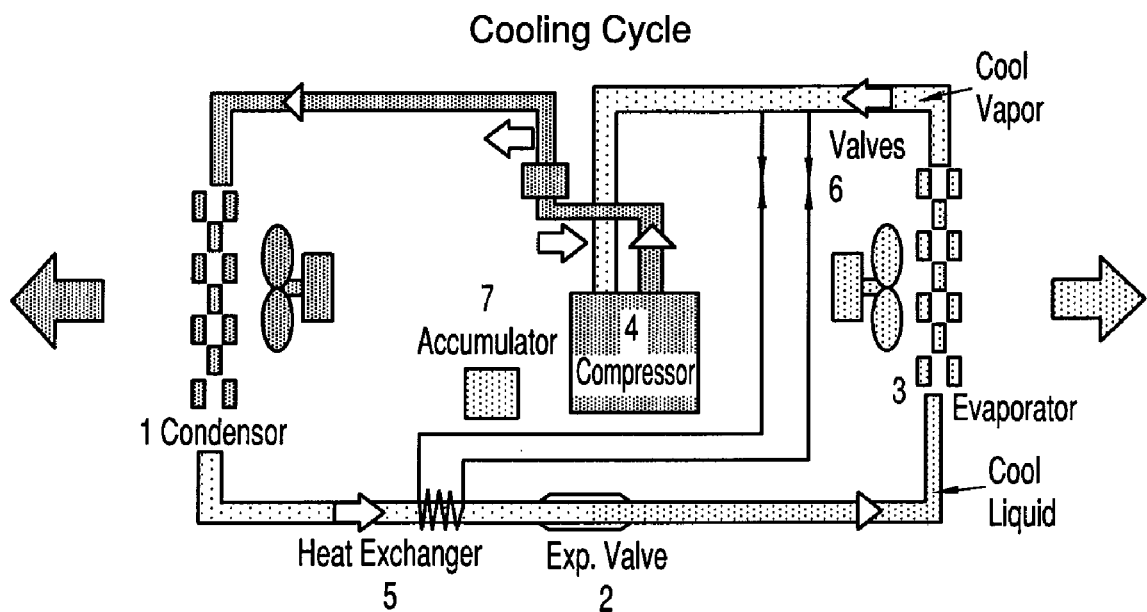
FIG. 5 is a schematic illustration of an air conditioning system according to another embodiment of the invention.

FIG. 5 shows a similar air conditioning I air cooling apparatus with additional feedback loop and accumulator compressor system. The accumulator segregates the liquid phase of the refrigerant. Where (1) is the condenser, (1A) condenser fan, (2) is the expansion valve, (3) is the evaporator, (3A) evaporator fan, (4) is the compressor, (5) is the heat exchanger, (6) are solenoid valves, (7) is the accumulator.

The simple vapor compression cycle (VCC) may work between −15 C evaporation temperature and 32 C condensation temperature with Ri 1 refrigerant. Comparing the performance of this cycle for the case of dry saturated vapor at the entrance to the compressor (1-2-3-4) to the case of sub-cooling by 7 degrees by a heat exchanger (5-6) placed as shown in FIG. 3, we obtain the following:

1. Enhancement in the refrigeration effect from 154.92 KJ/Kg to 190.62 KJ/Kg.
2. Increase in the coefficient of performance from 4.55 to 4.72.
3. Mass flow rate of 6.2 gm/Kg.

The VCC may also work between 2.455 bar and 11.88 bar (vapor and condenser pressures) in the heating mode. Comparing the effect of dry saturated vapor at the input to the compressor (1-2) to the case of super heated vapor, up 7K (7-8), on the efficiency of the VCC cycle we observe the following: The evaporator may work at T2=30 C while the condenser may work down to Ti −20 C with R22 refrigerant. In this case:

1. Enhancement in the refrigeration effect from 160.37 KJ/Kg to 163.3 KJ/Kg.
2. Decrease in the coefficient of performance from 4.016 to 3.798.

Figure 2:
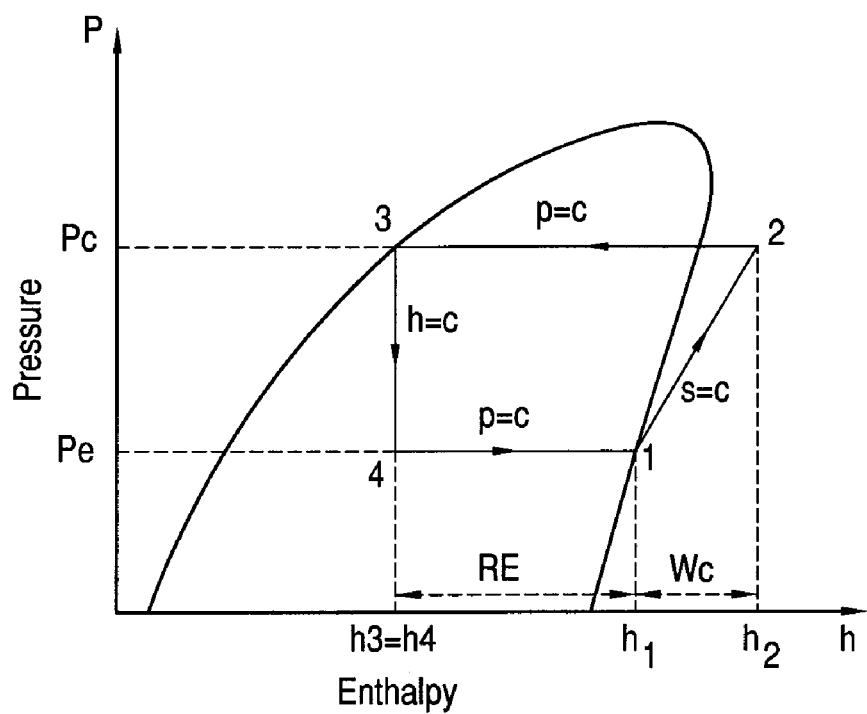
FIG. 2 is diagram of a conventional vapor compression cycle.
Figure 6:
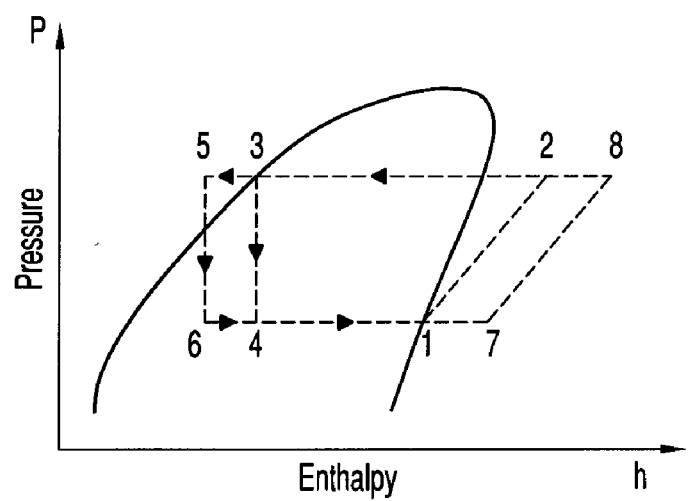
FIG. 6 is an enthalpy diagram for a system with one feedback loop.

The effect of the heat exchanger shown on FIG. 6. Here the pressure enthalpy curve follows a dotted line and not the solid line shown on FIG. 2.

FIG. 6 shows an air conditioning and heating apparatus pressure—Enthalpy diagram with one of two optional feedback loops. The result is developing a system with two feedback loops that improves the system efficiency. The dotted lines show the effect of the sub-cooling in the refrigeration feedback path and the super heating in the heating system feedback path. They both result in higher COP. This method works in all types and size to air conditions. AC with components such as variable speed counter-rotating condenser blower, which have more airflow, reduction in the blower noise and energy efficient. Multiple-speed compressors (Two-compressor systems) reducing peak energy under part-load conditions. State-of-the-art high-efficiency compressors Multiple-speed compressors Screw Compressor (Rotary) or Two-compressor systems to improve efficiency under part-load conditions. Improved and larger size heat exchange surfaces to allow more heat transfer of the extra regenerative heat transfer.

Figure 7:
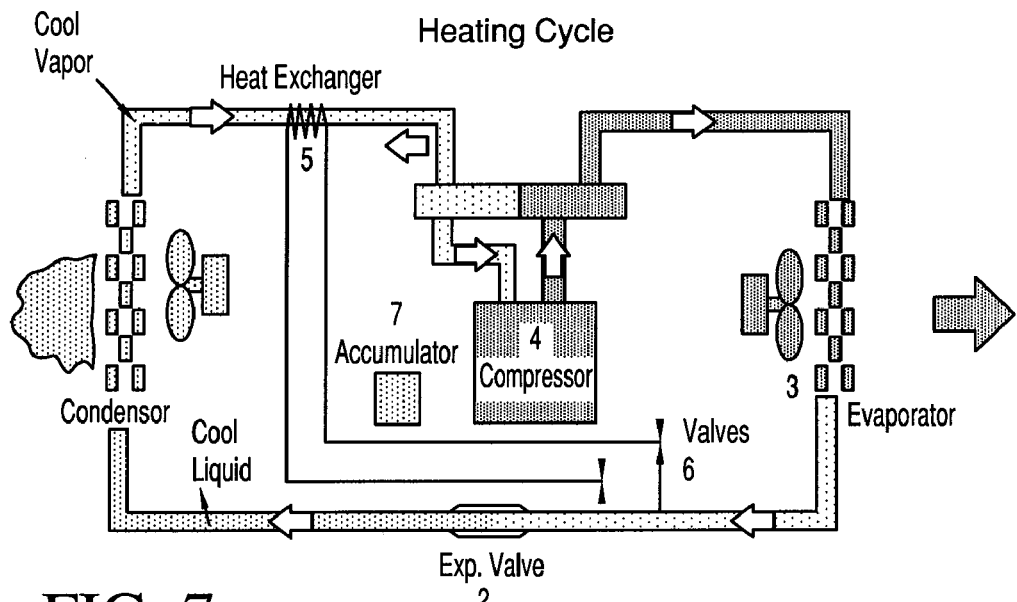
FIG. 7 is a schematic illustration of an air conditioning system with an additional feedback loop and a accumulator compressor system.

FIG. 7 shows a system and an apparatus for space heating using with one or more feed back loops. The Where (1) is the condenser, (1A) counter rotating condenser fan, (2) is the expansion valve, (3) is the evaporator, (3A) evaporator fan, (4) is the compressor, (5) is the heat exchanger, (6) are solenoid valves, (7) is the accumulator. The feedback loop connects the outlet temperature between the evaporator and the expander valve to pre-heat the input to the compressor. The heating system is equipped with solenoid valves (6) (SV) used to control the vapor flow path through the additional heat exchanger i.e. to allow or block the flow of vapor through the additional heat exchanger placed prior to the compressor for pre-heating the input to the compressor, to ensure warm vapor arrival at the compressor input.

Figure 8A:
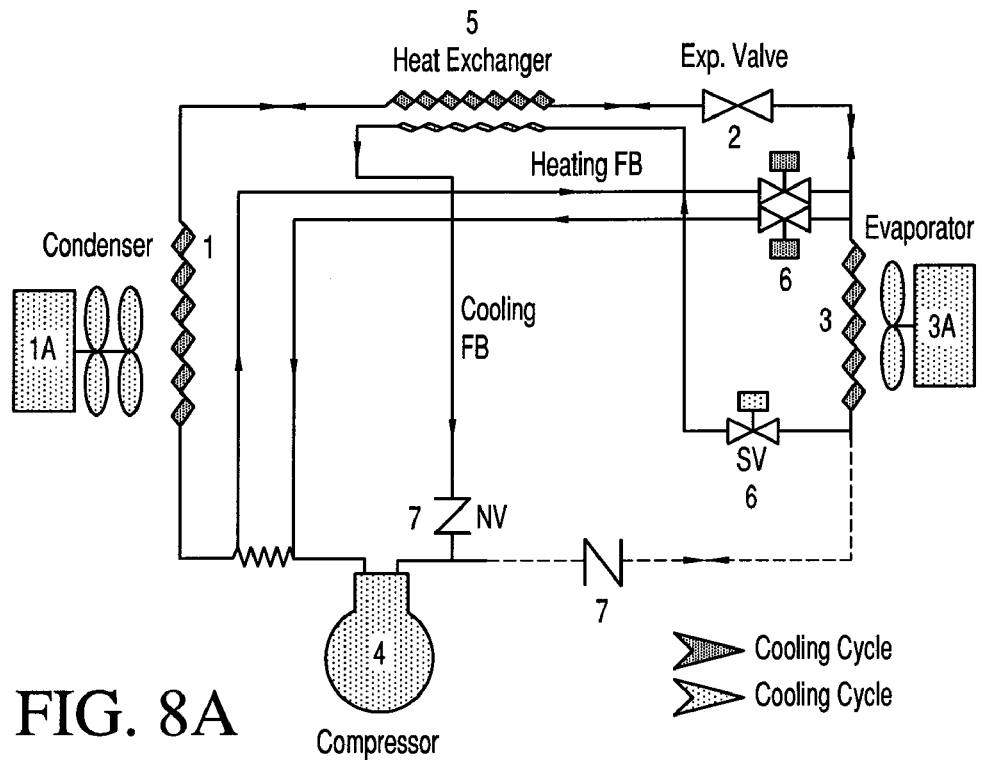
FIG. 8a is an schematic illustration of an air conditioning and heating apparatus with two feedback loops, two heat exchangers and an accumulator compressor system.

FIG. 8a shows a combined AC and heating apparatus that utilizes one or more heat exchangers to pre heat or pre cool refrigerant and therefore improve system efficiency. The combined air conditioning and heating apparatus that can be switched between two modes of operation one with and one without feed back loop by either manual or automatic control system command. Where (1) is the condenser, (1A) is the condenser fan, (2) is the expansion valve, (3) is the evaporator, (3A) is the evaporator fan, (4) is the compressor, (5) is the heat exchanger, (6) are solenoid valves, (7) is the reverse flow blocking valve.

Figure 8B:
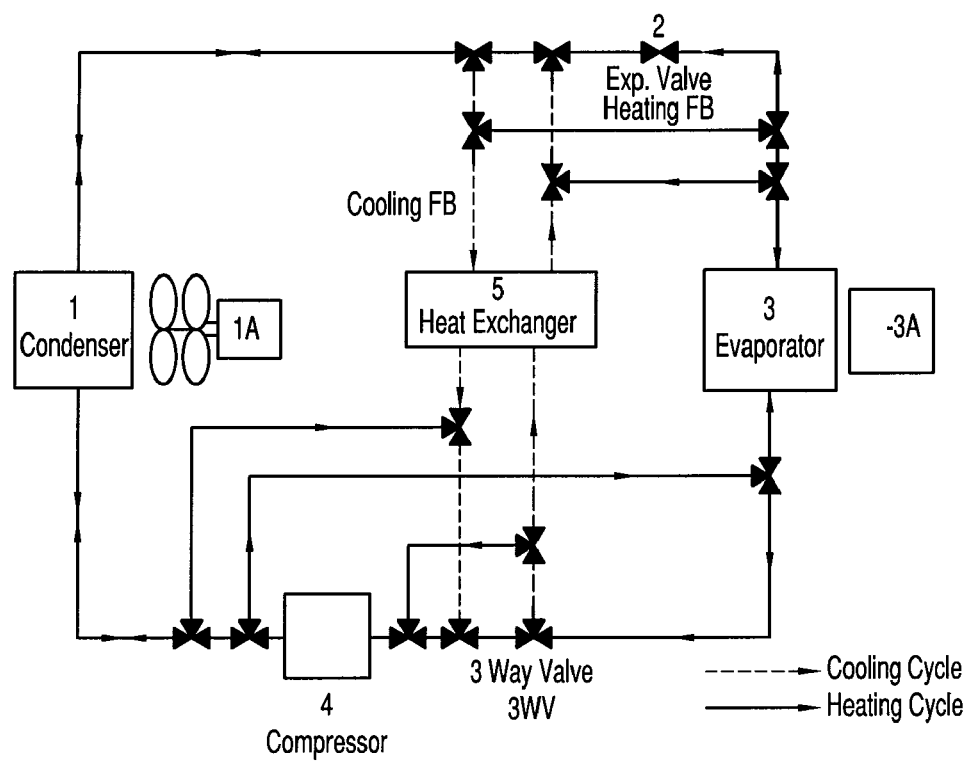
FIG. 8b is an schematic illustration of an air conditioning and heating apparatus with two feedback loops, one heat exchanger and accumulator compressor system.
Figure 9A:
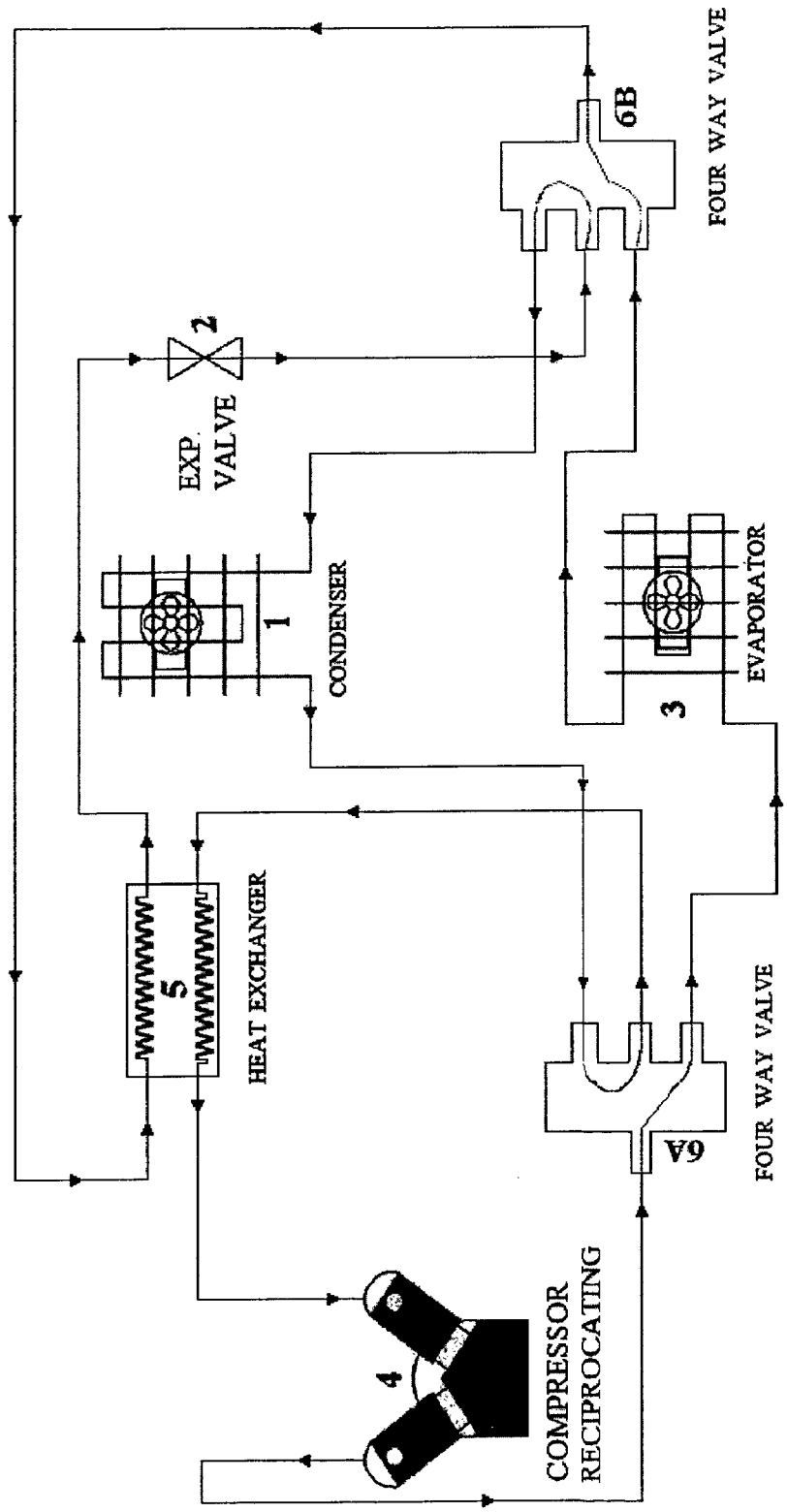
FIG. 9a is an schematic illustration of a heating mode operation incorporating a three way valve.

FIG. 8b: shows a combined air conditioning and heating system that utilizes one heat exchanger, one compressor and several 3-way valves to realize directionality in the refrigerant flow. The result is developing a system with two feedback loops that improves the system efficiency FIG. 9a: shows the heating cycle realized using four way valves. Where (1) is the condenser, (2) is the expansion valve, (3) is the evaporator, (4) is the compressor, (5) is the heat exchanger, with (6A & 6B) 3 way valves and solenoid valves.

Figure 9B:
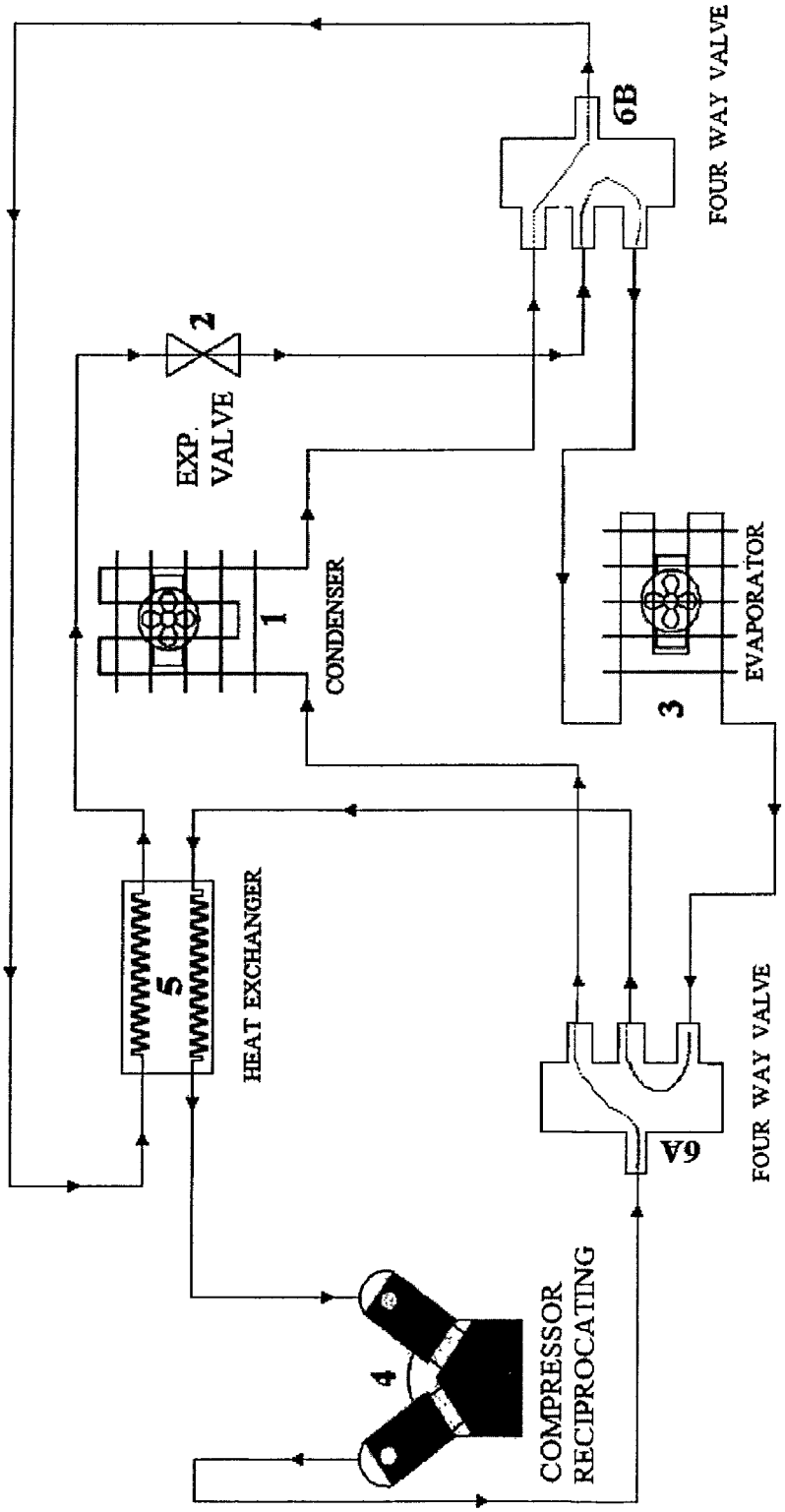
FIG. 9b is a schematic illustration of an air conditioning system in the cooling mode.

FIG. 9b: shows the cooling cycles realized using four way valves. Where (1) is the condenser, (2) is the expansion valve, (3) is the evaporator, (4) is the compressor, (5) is the heat exchanger and (6A & 6B) 3 way valves and solenoid valves.

Figure 10A:
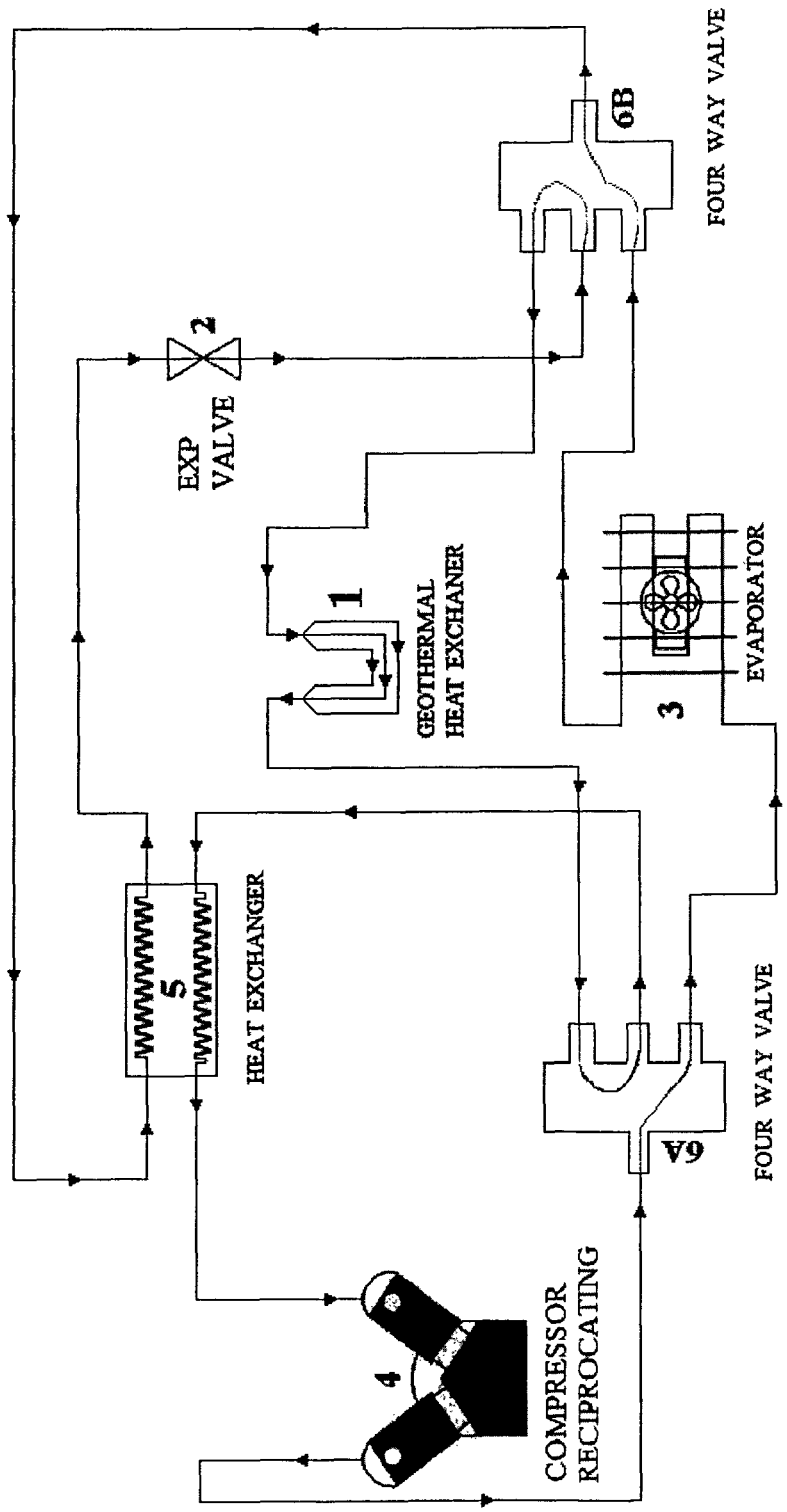
FIG. 10a is a schematic illustration of the cooling mode realization using a geothermal condenser.

FIG. 10a: shows the heating cycle realized using four way valves. Where (1) is the geothermal condenser, (2) is the expansion valve, (3) is the evaporator, (4) is the compressor, (5) is the heat exchanger, with (6A & 6B) 3 way valves and solenoid valves.

Figure 10B:
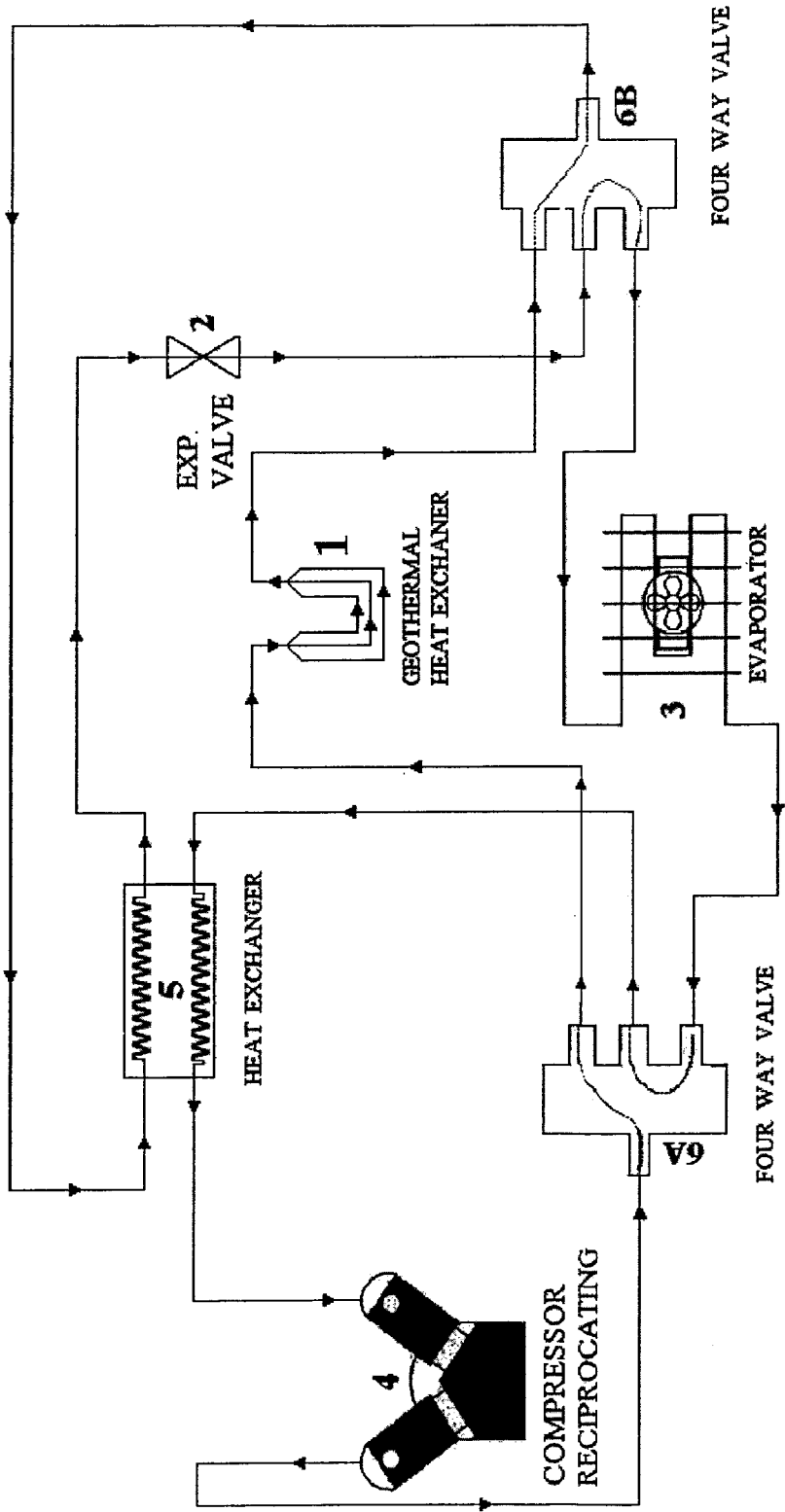
FIG. 10b is a schematic illustration showing a heating mode realization using a geothermal condenser.
Figure 10B:
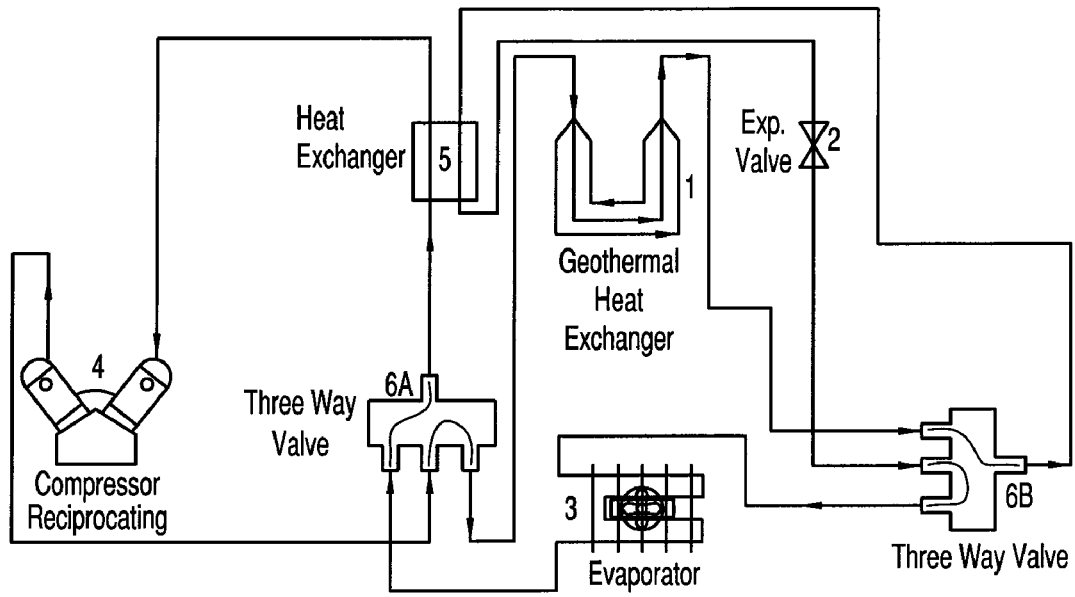

FIG. 10b: shows the cooling cycle realized using four way valves. Where (1) is the geothermal condenser, (2) is the expansion valve, (3) is the evaporator, (4) is the compressor, (5) is the heat exchanger, with (6A & 6B) 3 way valves and solenoid valves.

Heat Exchanger

A device built for efficient transfer of heat from one fluid to another, whether a solid wall separates the fluids so that they never mix, or the fluids directly contacted. They are widely used in refrigeration, air conditioning, space heating, power production, and chemical processing. One common example of a heat exchanger is the radiator in a car, in which the hot radiator fluid cooled by the flow of air over the radiator surface.

Heat Exchangers fall into a number of categories, name parallel-flow, counter-flow, and cross-flow. These classifications pertain to the flow definition, i.e. a parallel-flow heat exchanger allows the fluids to enter the device at the same end and travel through it in parallel mode, exiting at the opposite end. Counter-flow devices force the fluids to enter at opposite ends and also exit opposite from one another. Cross-flow exchangers, on the other hand, have the fluids traveling at right angles to one another through the device.

Figure 11A:
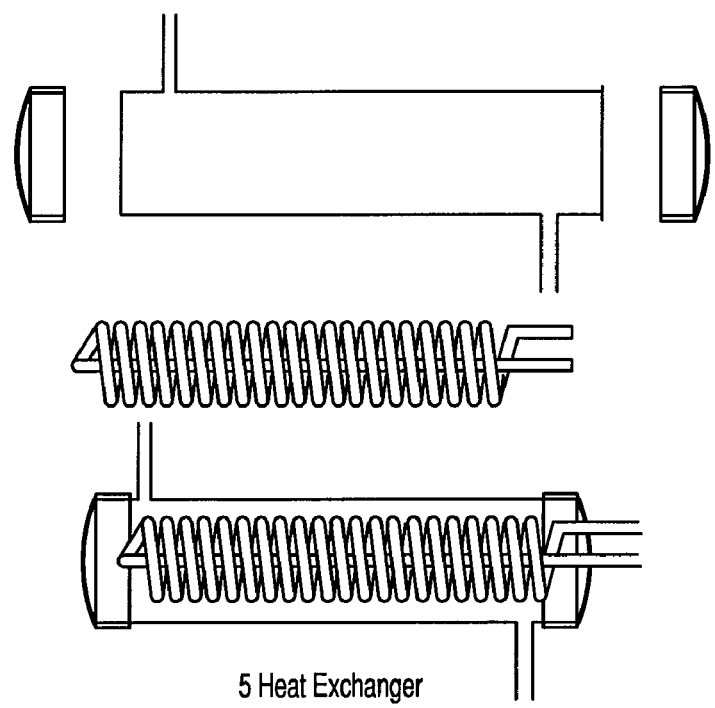
FIG. 11a is a schematic illustration of a heat exchanger consisting of a copper tube wound to exchange heat between different nodes of the refrigeration loop.

FIG. 11a shows a heat exchanger unit consists of a copper tube wound to exchange the heat from the refrigerant flow to the expander and the feedback loop.

In the refrigeration cycle the feedback loops provides heat transfer between the node following the evaporator and the node before the expander valve or capillary. In this case the inner wound tube may circulate for example, the warmer refrigerant node after the evaporator. The cooler node before the expander valve will circulate in the outer jacket in this case. The inner wound tube is made out of high thermal conductivity copper. The outer jacket may be made of thermally isolated low thermal conductivity material, e.g. stainless steel. Thermal insulation applied onto the outer jacket and the tubes.

Figure 11B:
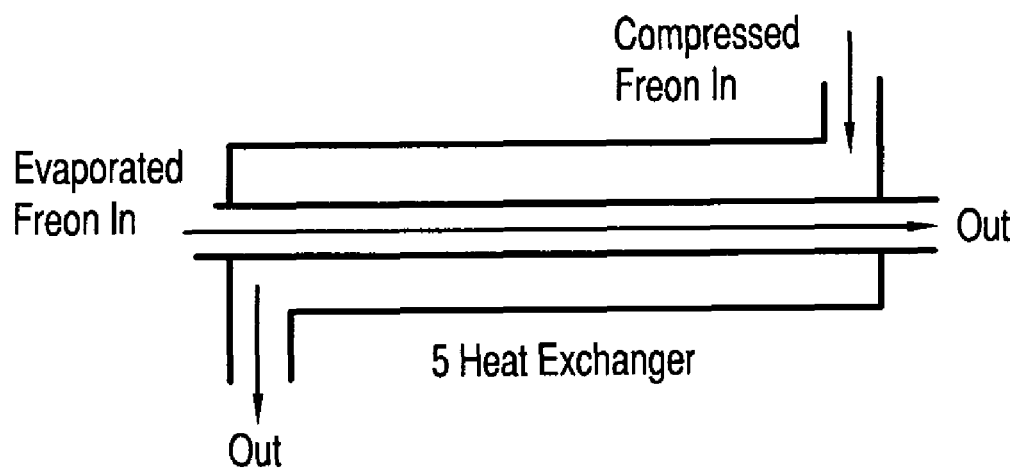
FIG. 11b demonstrates a tube in tube counter flow heat exchanger with cold input.

FIG. 11b shows a simple representation of the tube in tube heat exchanger with the colder refrigerant inside.

Figure 11C:
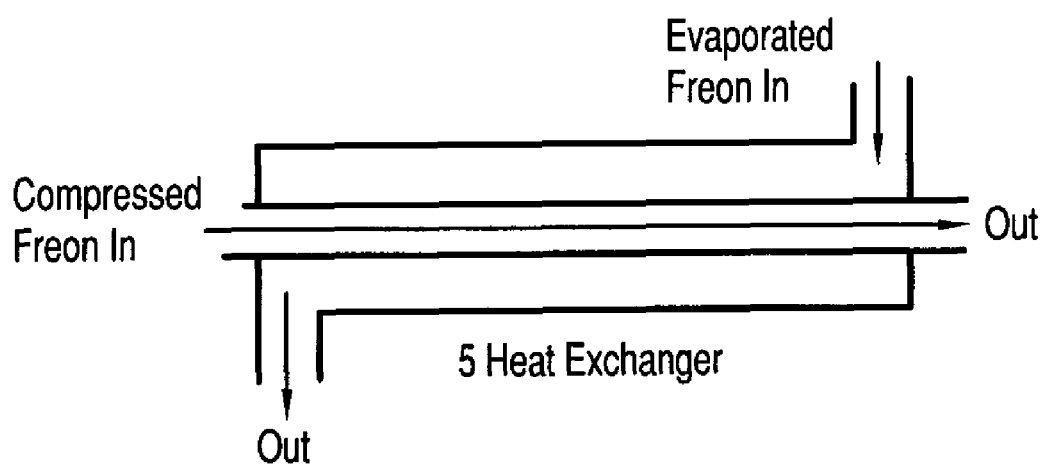
FIG. 11c demonstrates a tube in tube counter flow heat exchanger with hot input.

FIG. 11c shows a simple representation of the tube in tube heat exchanger with the warmer refrigerant inside. This results in operation that is more efficient.

Figure 12:
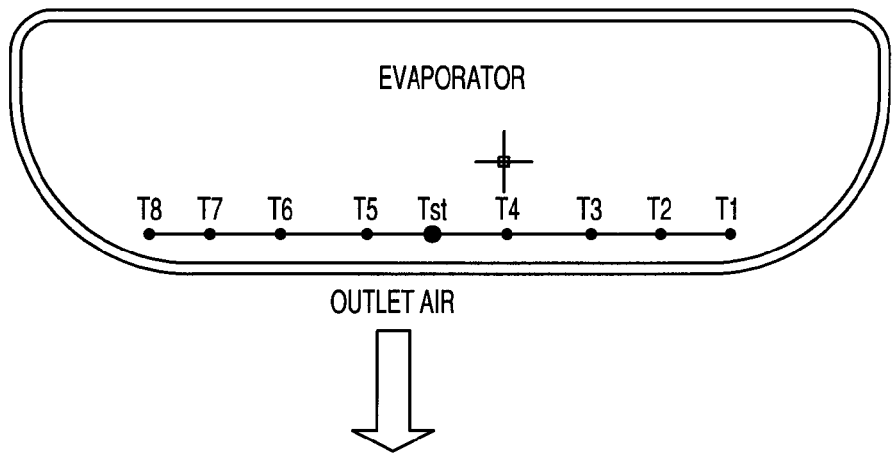
FIG. 12 is a schematic illustration of an evaporator with various temperature inputs.

The Evaporator:

Refer to FIG. 12 for an illustration of thermal profiling of the evaporator surface. An example of the thermal readings recorded on the evaporator outlet temperature at evaporator fan speed low, medium and high are shown on Table 1. Controlling the evaporator fan speed based on the load target temperature and the thermal profile of the surface of the evaporator is one of the features of the present invention.

Control Hardware and Software

Calibrated thermocouples, T.C, are used to measure the temperatures of the internal nodes of the AC system. Using RS232 interface for optional data logging of the temperature.

Figure 13:
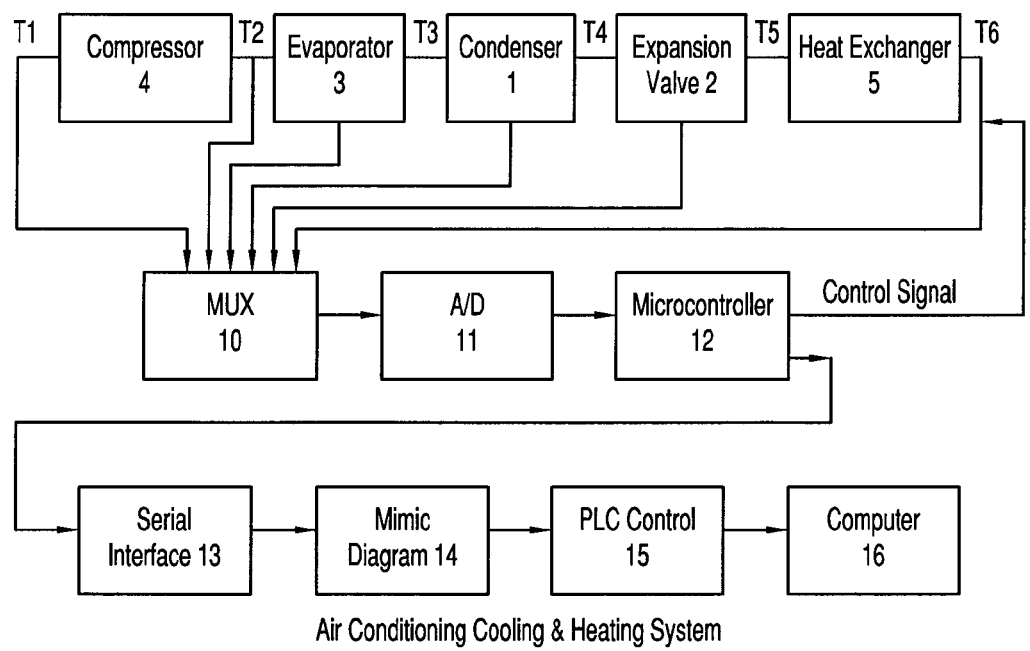
FIG. 13 is a flow diagram of a smart climate control system
Figure 14A:
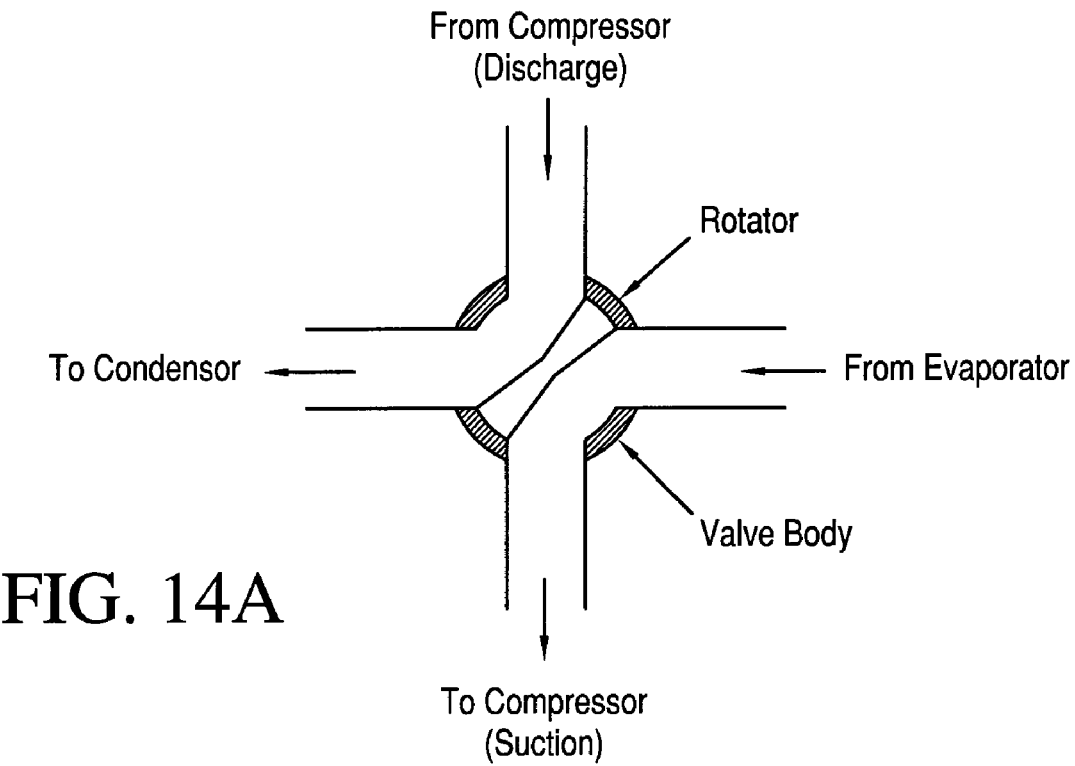
FIG. 14a is a schematic illustration of a four-way valve as positioned in a cooling mode of an air conditioning system in accordance with the invention.
Figure 14B:
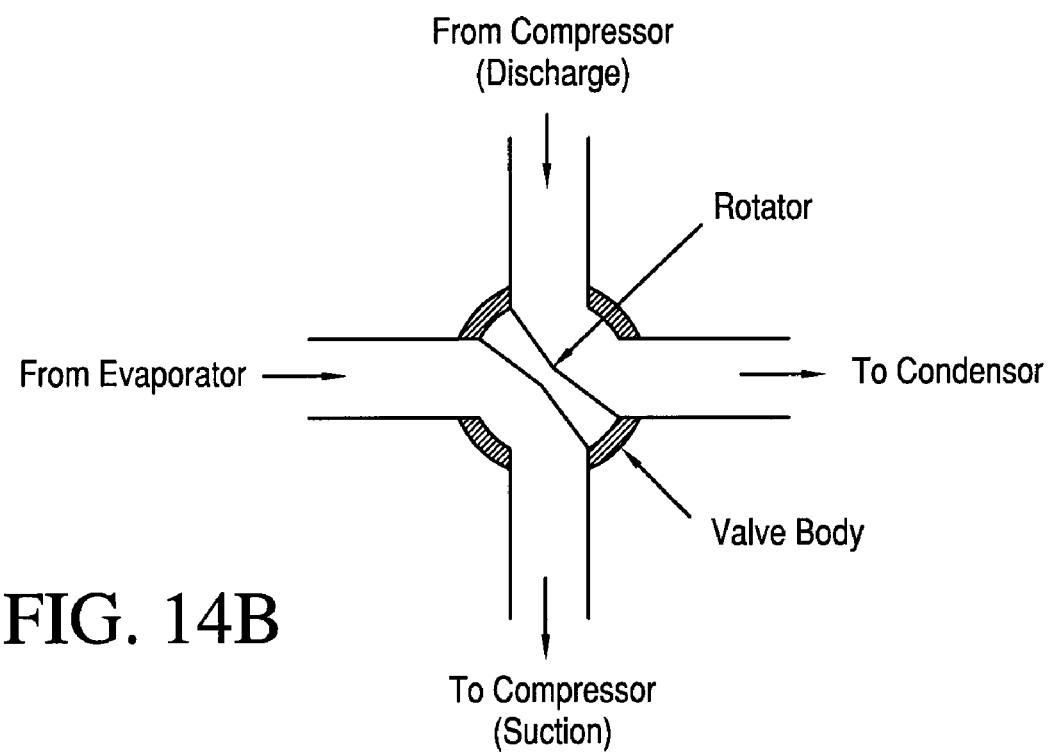
FIG. 14b is a schematic illustration of a four-way valve as positioned in a heating mode of an air conditioning system in accordance with the invention.

FIG. 13 shows the climate control system containing compressor (4), evaporator (3), condenser (1), expansion valve (2), heat exchanger (5), Multiplexer (1), analog to digital converter (11), microcontroller (12), serial interface (RS232) (13), mimic diagram (14), PLC control (15) and computer system (16) containing control and date display software (SCADA).

The electronic control and relay board is equipped with 2 to 10 relays to control the on/off of solenoid valves, the 3 way valves and 2 speed fan driver. The electronic control plots the path of the refrigerant through the loop and the selected feedback loop. It is also able to communicate with Infrared or wireless port to the remote controller. Temperature measurement electronics measures the ambient temperature, the entered target temperature and plots the optimal control strategy with and without the feedback loops to arrive at the target temperature and humidity.

The embedded microcontroller software may perform the following control functions:

1. Compressor Speed.
2. Compressor Pressure.
3. Compressor Input Temperature.
4. Compressor Output Temperature. (Condenser Input Temperature)
5. Condenser Output Temperature.
6. Condenser Blower Speed.
7. Evaporator Input Temperature.
8. Evaporator Output Temperature.
9. Evaporator Fan Speed.
10. Regenerative Feed Back Valve Position.

The control strategy selects between a path of rapid convergence to the target temperature and a path that minimizes the compressor on-time is directly proportional to the usage of energy, the set fan speed and the maintenance cycle. The electronics will also measure the compressor temperature and provide cooling locally via a fan. The electronics can also measure the consumed electrical energy on refrigerant circuit. The following tables illustrate typical measurements of the temperature on the nodes of the AC loop under different fan speeds (high/low/medium).

T2 (temperature after condenser and before heat exchanger).

T5 (temperature after heat exchanger).

At Low Speed:

T2=19.2 C.

T5 15.8 C.

At Medium Speed:

T2=18.4 C.

T5=15.3 C.

At High Speed:

T2=19.7 C.

T5=16.7 C.

Current supplied without heat exchanger=9.3 A. Current supplied with heat exchanger=8.6 A. The power saving is 15% and more when we account to the increased compressor off time.

While the invention has been described in connection with its preferred embodiments it should be recognized that changes and modifications may be made therein without departing from the scope of the appended claims.

Temperature Reading

TABLE 1

The thermal readings recorded on the evaporator outlet at different evaporator fan speed.

| | T.R.(C.) At Low Speed | | T.R.(C.) At Medium Speed | | T.R.(C.) At High Speed |
|---|---|---|---|---|---|
| T1 | 10.17 | T1 | 11.6 | T1 | 13.33 |
| T2 | 11.17 | T2 | 12 | T2 | 13.12 |
| T3 | 11.52 | T3 | 12.1 | T3 | 12.3 |
| T4 | 10.33 | T4 | 11.84 | T4 | 12.75 |
| T5 | 10.53 | T5 | 12.3 | T5 | 12.74 |
| T6 | 10.97 | T6 | 12 | T6 | 12.6 |
| T7 | 10.7 | T7 | 12.35 | T7 | 12.6 |
| T8 | 10.64 | T8 | 12.15 | T8 | 12.7 |
| Ts | 2.2 | Ts | 2.4 | Ts | 2.8 |

Case1 Temperature Reading

When the Evaporator Fan at Low Speed.

T Before=21.

T Ambient=18.

T After=7.

TABLE 2-a

When the Evaporator Fan Stopped

| Experiment No | T1 After Compressor | T2 After Condenser | T3 After Evaporator | T4 After Expansion Valve |
|---|---|---|---|---|
| 1 | 22 | 22 | 14.3 | 13.3 |
| 2 | 22.4 | 23.2 | 17.7 | 16.7 |
| 3 | 23.3 | 23 | 18.1 | 17.1 |
| 4 | 21.5 | 22 | 16.4 | 15.2 |
| 5 | 21.8 | 23.6 | 17.2 | 16.2 |
| 6 | 23.3 | 23.3 | 18.6 | 17.6 |
| 7 | 22.5 | 22.9 | 18.9 | 17.9 |
| 8 | 24.2 | 25.4 | 19.1 | 18.1 |

TABLE 2-b

After Evaporator Fan Stopped With 5-30 Seconds)

| Experiment No | T1 | T2 | T3 | T4 |
|---|---|---|---|---|
| 1 | 28.3 | 23 | 14.7 | 13.7 |
| 2 | 30.9 | 21.6 | 17.8 | 16.8 |
| 3 | 31.5 | 22.3 | 18.3 | 17.1 |
| 4 | 30.3 | 21.5 | 16.4 | 15.4 |
| 5 | 30.8 | 21.5 | 17.3 | 16.3 |
| 6 | 31 | 22 | 18.6 | 17.7 |
| 7 | 31.3 | 21.3 | 18.9 | 17.9 |
| 8 | 31.5 | 22.5 | 19.2 | 18.2 |

Case2 Temperature Reading

When the Evaporator Fan at High Speed.
T Before=22.
T Ambient=24.5.
T After=17.

TABLE 3-a

When the Evaporator Fan Stopped

| Experiment No | T1 After Compressor | T2 After Condenser | T3 After Evaporator | T4 After Expansion Valve |
|---|---|---|---|---|
| 1 | 26.9 | 23.9 | 20.5 | 19.5 |
| 2 | 25.2 | 22 | 20.5 | 19.5 |
| 3 | 27 | 24.8 | 20.2 | 19.2 |
| 4 | 27.8 | 24.9 | 20.4 | 19.4 |
| 5 | 26.3 | 23.6 | 20 | 19 |
| 6 | 26.2 | 23.7 | 20 | 19 |
| 7 | 26.7 | 24.4 | 20.7 | 19.7 |
| 8 | 27.1 | 24.9 | 20.5 | 19.5 |

TABLE 3-b

At Steady State

| Experiment No | T1 | T2 | T3 | T4 |
|---|---|---|---|---|
| 1 | 35.5 | 23.6 | 20.9 | 19.9 |
| 2 | 35.1 | 23.4 | 20.8 | 19.8 |
| 3 | 35.5 | 25.5 | 20.6 | 19.6 |

TABLE 3-b-continued

At Steady State

| Experiment No | T1 | T2 | T3 | T4 |
|---|---|---|---|---|
| 4 | 35 | 23.8 | 20.7 | 19.7 |
| 5 | 34.8 | 23.3 | 20.6 | 19.6 |
| 6 | 34.7 | 23.2 | 20.6 | 19.6 |
| 7 | 36 | 25.2 | 21.1 | 20.1 |
| 8 | 35.3 | 24.4 | 20.9 | 19.9 |

Case 3 Temperature Reading when the Evaporator fan at medium speed.
T Before=25.
T Ambient=20.5.
T After=17.

TABLE 4-a

When the Evaporator Fan Stopped

| Experiment No | T1 After Compressor | T2 After Condenser | T3 After Evaporator | T4 After Expansion Valve |
|---|---|---|---|---|
| 1 | 26.8 | 25.8 | 18.4 | 17.4 |
| 2 | 27.4 | 25.9 | 18.6 | 17.6 |
| 3 | 28.7 | 26.2 | 18.7 | 17.7 |
| 4 | 26.7 | 24.9 | 19 | 18 |
| 5 | 27.9 | 25.8 | 19 | 18 |
| 6 | 25.6 | 25.2 | 19.1 | 18.7 |
| 7 | 27.3 | 25.6 | 19.2 | 18.2 |
| 8 | 26.9 | 26 | 19.3 | 18.3 |

TABLE 4-b

At Steady State

| Experiment No | T1 | T2 | T3 | T4 |
|---|---|---|---|---|
| 1 | 33.2 | 23.3 | 18.5 | 17.5 |
| 2 | 33.2 | 22.3 | 18.7 | 17.7 |
| 3 | 33.9 | 23.9 | 18.9 | 17.9 |
| 4 | 32.3 | 22.6 | 18.9 | 17.9 |
| 5 | 33.3 | 22.7 | 19.1 | 18.1 |
| 6 | 33.2 | 22.7 | 19.2 | 18.2 |
| 7 | 33.9 | 23.6 | 19.2 | 18.2 |
| 8 | 33.7 | 23.2 | 19.3 | 18.3 |

What is claimed is:
1. An air conditioning system comprising:
a condenser, an expansion valve, an evaporator and a compressor interconnected in a closed loop system;
a refrigerant disposed in said closed loop system and a motor for driving said compressor to compress said refrigerant and pump said refrigerant through said condenser, said expansion valve, said evaporator and back to said compressor during a cooling cycle;
a heat exchanger disposed in said closed loop system between said condenser and said expansion valve for pre-cooling the refrigerant before it flows into said expansion valve, and a feedback loop in said closed loop system for conducting refrigerant from said evaporator back through said heat exchanger for raising the temperature of the refrigerant before returning the refrigerant to said compressor;

a solenoid valve between said evaporator and said heat exchanger; and a first blocking valve between said evaporator and said compressor and a second blocking valve between said heat exchanger and said compressor and an electronic control for adjusting and/or throttling the cold refrigerant flow:

a pair of fans and wherein a first of said pair of fans cools refrigerant in said condenser and a second of said pair of fans cools refrigerant in said evaporator;

wherein said first of said pair of fans is a variable speed counter rotating fan;

wherein said compressor is a multiple compressor for reducing peak energy under part load conditions;

wherein said first and second fans and compressor are operated by D.C. motors; and, a safety high pressure system to override the solenoid valve and close it to thereby reduce the pressure on said compressor;

wherein each of said condenser, expansion valve, heat exchanger, evaporator and compressor have an inlet and an outlet for receiving and discharging refrigerant and which includes a plurality of thermocouples for temperature measurement within said system and wherein a first of said thermocouples is disposed between the outlet of said compressor and said inlet of said condenser, said second of said thermocouples is disposed between said outlet of said condenser and said inlet of said heat exchanger, a third of said thermocouples is disposed between said output of said heat exchanger and said input of said evaporator valve, a fourth of said thermocouples disposed between said output of said evaporation valve and said inlet of said evaporator, a fifth of said thermocouples disposed between said outlet of said evaporator and said solenoid valve and a sixth of said thermocouples disposed between said second blocking valve and said input of said compressor; and, said air conditioning system further comprising a second feedback loop, wherein the heat exchanger is two heat exchangers and wherein said compressor is an accumulator compressor system; and which includes an additional thermocouple for measuring the ambient temperature and an electronic control board for inputting a target temperature and wherein the efficiency of the system is improved by a feedback determined by the ambient temperature and the target temperature; and a four-way valve for changing the flow of refrigerant between the two modes of operation, one mode with and one mode without a feedback loop.

2. An air conditioning system comprising:

a condenser, an expansion valve, an evaporator and a compressor interconnected in a closed loop system;

a refrigerant disposed in said closed loop system and a motor for driving said compressor to compress said refrigerant and pump said refrigerant through said condenser, said expansion valve, said evaporator and back to said compressor during a cooling cycle;

a heat exchanger disposed in said closed loop system between said condenser and said expansion valve for pre-cooling the refrigerant before it flows into said expansion valve, and a feedback loop in said closed loop system for conducting refrigerant from said evaporator back through said heat exchanger for raising the temperature of the refrigerant before returning the refrigerant to said compressor;

a solenoid valve between said evaporator and said heat exchanger; and a first blocking valve between said evaporator and said compressor and a second blocking valve between said heat exchanger and said compressor and an electronic control for adjusting and/or throttling the cold refrigerant flow:, a pair of fans and wherein a first of said pair of fans cools refrigerant in said condenser and a second of said pair of fans cools refrigerant in said evaporator;

wherein said first of said air of fans is a variable speed counter rotating fan;

wherein said compressor is multiple compressor for reducing peak energy under part load conditions;

wherein said first and second fans and compressor are operated by D.C. motors; and, a safety high pressure system to override the solenoid valve and close it to thereby reduce the pressure on said compressor;

wherein each of said condenser, expansion valve, two heat exchangers, evaporator and accumulator compressor system, have an inlet and an outlet for receiving and discharging refrigerant and which includes a plurality of thermocouples for temperature measurement within said system and wherein a first of said thermocouples is disposed between the outlet of said accumulator compressor system and said inlet of said condenser, said second of said thermocouples is disposed between said outlet of said condenser and said inlet of said heat exchanger, a third of said thermocouples is disposed between said output of said heat exchanger and said input of said evaporator valve, a fourth of said thermo couples disposed between said output of said evaporation valve and said inlet of said evaporator, a fifth of said thermocouples disposed between said outlet of said evaporator and said solenoid valve and a sixth of said thermocouples disposed between said second blocking valve and said input of said accumulator compressor system, which includes an additional thermocouple for measuring the ambient temperature and an electronic control board for inputting a target temperature and wherein the efficiency of the air conditioning system is improved by a feedback determined by the ambient temperature and the target temperature, a four-way valve for changing the flow of refrigerant between the two modes of operation, one mode with and one mode without a feedback loop that further includes a second feedback circuit and a second 3-way valve to control the refrigerant flow in one of said feedback circuits during a heating or a cooling cycle; and, said air conditioning system further comprising a second feedback loop, wherein the heat exchanger is two heat exchangers and wherein said compressor is an accumulator compressor system; and which includes an additional thermocouple for measuring the ambient temperature and an electronic control board for inputting a target temperature and wherein the efficiency of the system is improved by a feedback determined by the ambient temperature and the target temperature; and a four-way valve for changing the flow of refrigerant between the two modes of operation, one mode with and one mode without a feedback loop;

a second feedback circuit and a second three-way valve to control the refrigerant flow in one of said feedback circuits during a heating or cooling cycle.

3. An air conditioning system according to claim 2 which includes temperature measurement electronics to measure the ambient temperature and plot a control strategy with and without the feedback loop to arrive at the target temperature.

4. An air conditioning system according to claim 3 in which the control strategy is selected between a path of rapid conversions to the target temperature and a path that minimizes the compressor running and the fan to continue cooling the condenser until it reaches the ambient temperature on time to set the fan time at the maintenance cycle.

5. An air conditioning system according to claim 4 in which the electronic control measures the compressor temperature and provides compressor cooling via a fan.

* * * * *